Figure 1:
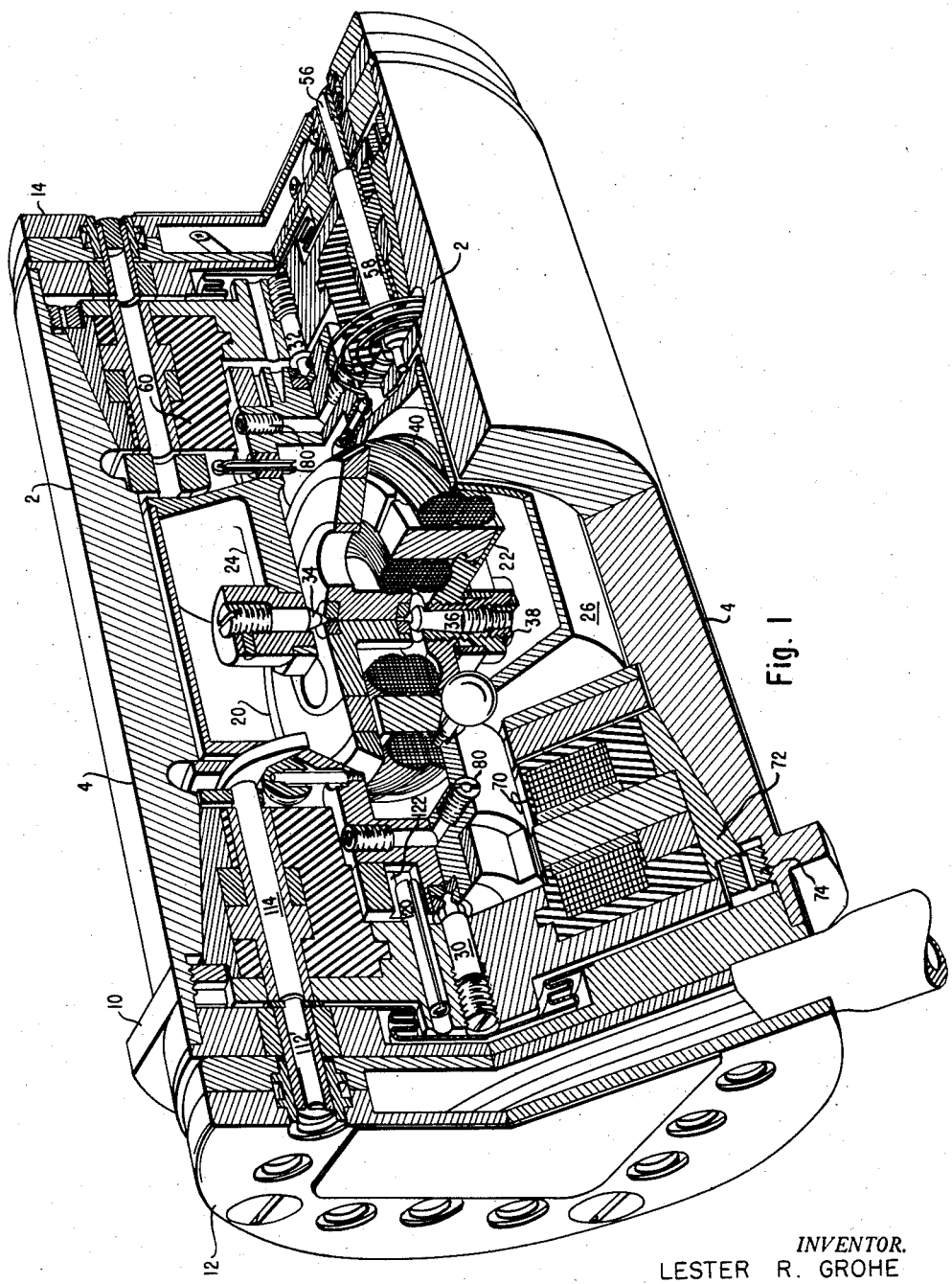

Oct. 14, 1958 L. R. GROHE 2,855,782
GYROSCOPIC APPARATUS
Filed Jan. 12, 1955 2 Sheets-Sheet 1

*INVENTOR.*
LESTER R. GROHE
BY Kenway, Jenney, Witter
+ Hildreth
ATTORNEYS

Oct. 14, 1958  L. R. GROHE  2,855,782
GYROSCOPIC APPARATUS
Filed Jan. 12, 1955  2 Sheets-Sheet 2
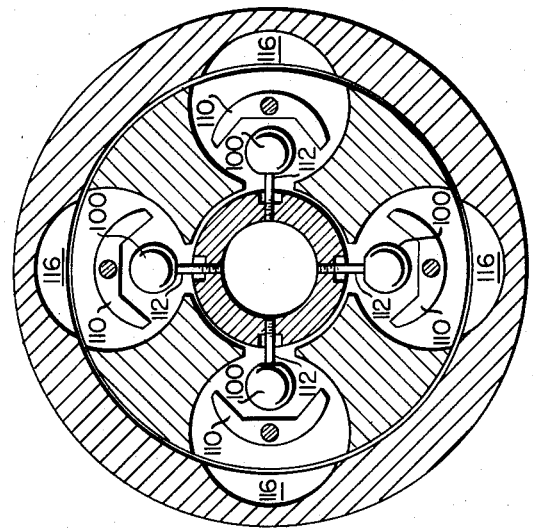
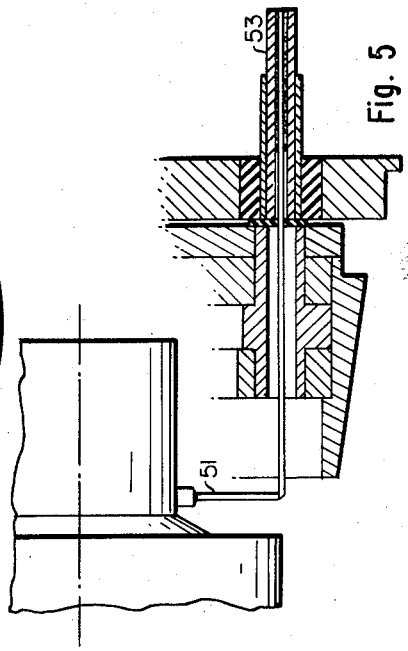
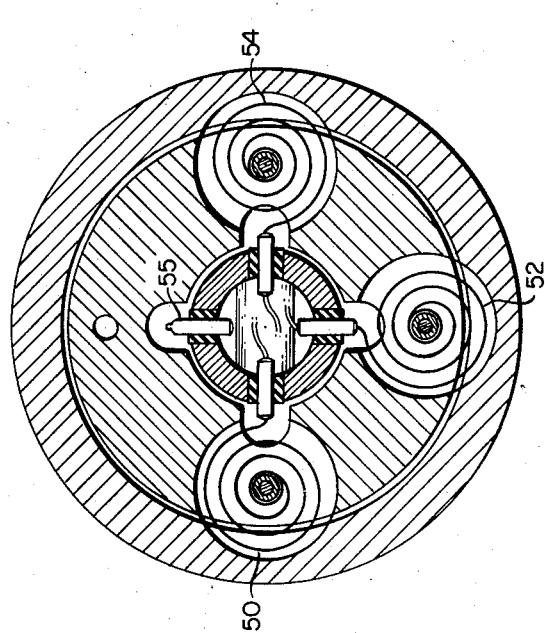
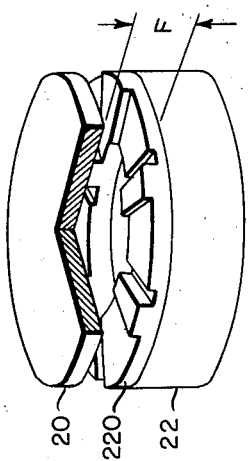
INVENTOR.
LESTER R. GROHE
BY Kenway, Jenney, Witter
& Hildreth
ATTORNEYS

United States Patent Office 2,855,782
Patented Oct. 14, 1958

2,855,782

GYROSCOPIC APPARATUS

Lester R. Grohe, Hingham, Mass., assignor to Research Corporation, New York, N. Y., a corporation of New York Application January 12, 1955, Serial No. 481,295

8 Claims. (Cl. 74—5.4)

The subject invention relates to gyroscopic apparatus and in particular to improved single-degree-of-freedom gyros useful in highly accurate control systems.

In its preferred embodiment this invention relates to single-degree-of-freedom gyros similar to those used in surface fire control apparatus. It is necessary that such gyros be constructed with extreme accuracy and operate with a high degree of reliability. The gyro gimbal structure must be balanced in one plane in order that the errors introduced into the system by faulty gyro operation may be minimized. It is furthermore highly desirable that this type of gyro be constructed in as small a form as possible in order that the entire control system may take up little space and weight.

However, attempts to miniaturize these gyros have encountered great difficulty in removing the errors inherent in even the most accurate manufacturing and assembly techniques. Manufacturing tolerances of the highest obtainable accuracy which may be satisfactory in relative large gyros result in unbalanced forces which are intolerable in a miniaturized version of the same gyro.

It is therefore the object of this invention to provide a gyro of a relatively simple and easily constructed design which contains improved means for coarse balancing during construction and for fine balancing by external adjustment after assembly. It is a further object to provide such a device which in a miniaturized version, is both rugged and highly accurate.

It is a feature of this invention that it provides a highly accurate and convenient means of obtaining final balancing adjustments of great precision after the gyro has been finally assembled through the use of balancing weights which are fixed to the gyro gimbal by means of bendable rods and which may be positioned by means of a control cam from outside the case. It is a further feature of this invention that it provides means for driving the gimbal into alignment with signal generator null by the adjustment of coil springs which act as lead-in wires to the power windings of the gyro wheel and which are also subject to adjustment from outside the case after the gyro has been assembled.

An additional feature of this invention is the rotor-stator structure of the gyro wheel which provides a fluid bearing support for the rotor tending to cancel the magnetic attractive force between the rotor and stator which would otherwise act to cause unequal wear on the bearings and thereby lead to faulty operation and unbalance.

The invention will be more easily understood with reference to the figures in which:

Fig. 1 is a cutaway view of the entire gyroscopic apparatus,

Fig. 2 is a cross section of this apparatus through the section labelled 2—2 showing the power leads to the inner case in the form of springs, Fig. 3 is a schematic detail view showing a portion of the rotor stator structure in order to illustrate the air bearing support for the rotor, Fig. 4 is a cross section through the case in the plane 4—4 showing the arrangement of the balancing staffs and weights and the associated bending cams, Fig. 5 is a detail view of an alternative construction to that shown in Fig. 2 for the power leads.

As shown in Fig. 1 the preferred embodiment of this invention is a single-degree-of-freedom gyro contained within a heavy walled outer case 10 which, together with the end plates 12 and 14 forms a sealed hollow cylinder. The gyro rotor 20 and stator 22 are supported by the gimbal structure 24 which is a part of a sealed inner case 26 supported by flotation in a dense fluid contained between the inner and outer cases, as described in copending application for gyroscopic apparatus by Jarosh, Haskell and Dunnell, Serial No. 210,246 filed February 9, 1951, now Patent No. 2,752,791 dated July 3, 1956. Because of the support provided by this flotation the gravity forces exerted by the weight of the apparatus in the inner case on the output axis bearings 30 and 32, are reduced to a minimum. The fluid also acts as a viscous damping medium to resist motions of the gyro about its output axis by means of a damping torque.

The rotor is supported on its spin axis by a spherical bearing 34 and a conical bearing 36. The stator 22 is mounted as a part of the lower arm of the gimbal fork 24 which supports the rotor. The spin axis bearings supporting the rotor are preloaded by the differential screw 38 which permits the arms of the fork to be sprung to a precisely controlled amount which is necessary in order to accurately preload these bearings. The windings 40 on the stator structure are concentric about the spin axis and the rotor itself is in the shape of a T, so that the direction of the flux in this design is parallel to the spin axis of the rotor and the gap over which the flux passes is radial to the spin axis of the rotor.

The inner case is sealed against the buoying flotation liquid which surrounds it, and the inert gas which is utilized to provide the proper fluid bearing characteristics for the rotor is introduced through the tube 55 shown in Fig. 2. The conventional heater windings (not shown) are utilized to keep the fluid surrounding the case at the proper uniform temperature, and the outer case 10 is formed with relatively thick walls at its mid-section facing the inner case in order to provide a relatively uniform rate of heat conductivity away from the inner portion. The position sensing device 70 is carried in the case at one end of the gimbal case and at the other end the torque motor (not shown) carried in the assembly 60 applies a restoring torque to null the gyro.

As a result of the T-shaped rotor configuration, the force of the flux linking the stator and rotor tends to pull the rotor toward the stator and thus increase the load on the lower bearing 36. The bearings are made in conical and spherical form in order to reduce alignment problems, and the lower bearing 36 is the conical bearing which is capable of withstanding greater wear than the spherical bearing because it provides a greater supporting area. It is highly desirable even in this type of construction to provide a force which, during the spinning of the rotor, operates to counteract the attractive force between the rotor and stator. This objective is achieved in a manner which will be most easily described by reference to Fig. 3. As shown in that figure, the stator 22 carries upon its upper surface an embossed plastic layer 220 which projects into the radial air gap between the rotor and the stator in the form of shaped pads or steps. As the rotor 20 spins above this stepped surface it may be shown that the resulting laminar flow of gas between the rotor and stator provides a supporting force for the rotor which tends to counteract the force of the flux attracting the rotor to the stator. The supporting force is a function of the distance between the rotor and the stepped surface facing it on the stator, and the smaller the gap the greater the force tending to support the rotor. The supporting force increases exponentially rather than linearly as the gap narrows. However, it should be noted that the supporting force requires laminar flow and is decreased by any tendency toward turbulence caused either by defective design or excessive velocity. This bearing also depends for its characteristics upon the fluid between the stepped surface and the rotating smooth surface, and in this case it is contemplated that the inner case surrounding the gyro will be filled with an inert gas, preferably neon or helium, in order to obtain maximum heat conductivity combined with appropriate viscous shear characteristics.

This development has been described by reference to a smooth rotor and a step stator. The same results may be obtained if the step surface were a part of the rotor structure, spinning with respect to a smooth stator surface. As a practical matter the choice between the two constructions depends upon ease of assembly and the manufacturing method employed.

The use of a hydrodynamic supporting force at the end of a T-shaped rotor has been described in this application because the use of a T-shaped rotor provides a relatively large supporting area on which the hydrodynamic force can act and because the circumference of the rotor travels at a higher velocity than those portions of the rotor closer to the axis of rotation. It is, of course, possible to apply the same hydrodynamic forces to produce a hydrodynamic gas-lubricated journal bearing to support the rotor shaft either in this type of a pancake hysteresis motor or in a more conventional axial air gap hysteresis motor. However, the above described use of hydrodynamic support at the periphery of a T-shaped rotor is believed to supply a greater supporting force than could be obtained in a journal bearing utilizing this principle. Furthermore, this construction has the property of applying a maximum torque to automatically center the rotor. Any disturbance of the rotor from its equilibrium position tends to cause a restoring force which returns the rotor to equilibrium. These restoring forces apply a greater righting torque when they are applied to the end of this T-shaped rotor than they would if applied to a journal bearing near the axis of the rotor.

Utilizing a hydrodynamic journal bearing on the shaft slot creates the problem of how to support the shaft when the rotor is still. The above-described apparatus avoids this problem. In addition the differential screws used for preloading may be backed off when the rotor is up to speed and the rotor will be supported hydrodynamically with a minimum of friction loss.

As shown in Figures 1 and 2, the power for the windings on the rotor is delivered through springs 50, 52 and 54. Spring 50 is clamped in the end of a rotatable rod 56 which extends outward through the end of the case where it may be turned to adjust the spring tension after the device has been assembled. The other two leads are similarly controlled by rods extending out to the end of the case. Power leads are attached to the rods at a point inside the end cover, and the rods thereafter extend toward the spring lead inside an insulating sleeve 58 as shown in Fig. 1. The spiral power lead-in spring may be constructed so as to provide a substantially constant load regardless of small changes in the angular position of the rotor case itself.

An alternative, substantially equivalent construction is illustrated in Figure 5 in which the lead-in wire 51 is in the form of a straight torsional spring which turns 90° at one end before fastening to the inner case supporting the gimbal and which is soldered at the other end to the sleeve 53. In either form of construction the spring is used to supplement the torque generator in setting the dynamic null of the gyro 60 because excessive use of the torque generator places a side loading on the gimbal supporting pivots 30 and 32. In addition, the torque generator gives off heat which produces thermal gradients in a section of the case which is not designed to minimize such heat gradients.

At the other end of the inner floated case from the lead-in wires there is located the position sensing device 70, preferably of the type disclosed by Mueller in U. S. Patent No. 2,488,734 issued November 22, 1949, enclosed in a single tapered assembly element 72 together with the bearing 30 which supports the gimbal. It is necessary that the axis of the position sensing element 70 be perfectly aligned with the axis of the bearing 30, and in order to achieve this, these two elements are assembled in a jig and sealed in coaxial relationship with the use of a thermal plastic which forms the unit 72. This unit is then easily assembled by clamping it into the outer case 10 by means of the threaded ring 74. The taper in the case corresponds to the taper on the potted unit and facilitates centering of the assembly in the case 10 prior to final assembly.

The balance screws 80 at both ends of the sealed inner gimbal are used to achieve a rough static rotational balance of that element prior to assembly. Moreover, the invention contemplates very fine balancing adjustments after the entire unit has been assembled. This is especially desirable in view of the fact that the gyro apparatus described herein is particularly adapted for sub-miniature construction wherein the entire case may not exceed two inches in length and one inch in diameter. To achieve this final, highly accurate adjustment in static balance, the invention utilizes four balancing weights 100 supported at the end of balancing staffs 112, which are fixed to the inner case 26 as shown in Figures 1 and 4. For balancing purposes the case is simply a part of the gyro gimbal structure. Each staff is rigid to the extent that it will not bend under the force of any acceleration to which the device may be subjected. However, it is small in diameter, and constructed of a ductile material so that externally applied forces will be sufficient to bend the staff and thereby change the relative position of the balance weight with respect to the casing. This bending is achieved by means of the semicircular adjusting cams 110, each carried at the end of a shaft 112' which extends through the end of the casing and has a slotted end which may be turned by the use of screwdriver. This shaft is carried within the sleeve 114.

The operation of this balance adjusting mechanism may be best understood by reference to Fig. 4 which is a section through the line 4—4 showing the four balancing weights and their respective adjusting cams. As is illustrated in that figure, the cams and weights are carried within the chambers 116 and in the ordinary operating position the cam surfaces are sufficiently removed from the weights so that the inner case is free to rotate through a considerable angle about its axis. However, if the control rod 112' is turned, the inner surface of the cam will come in contact with the surface of the weight and may be used to bend the weight in either direction.

In order to limit motion of the inner case as force is applied to the balancing staff, a rod 120 is carried within the tapered insert 72 and projects into a slot 122 in the floated inner case. The dimensions of this slot or recess are such that the stop will not touch the sides of the chamber as the chamber turns about its axis within the ordinary operating range. However, as force is applied to the balancing staff the inner chamber will be forced against the stop and thereafter the applied force will be effective in bending the staff by the required amount. The stop 120 is also effective in keeping the pole pieces of the signal generating apparatus properly aligned within their normal operating range.

I claim:

1. A gyroscopic unit comprising a case, a gyro rotor, a gyro gimbal structure supporting the rotor, means for spinning the gyro rotor, a static weight adjusting member, a bendable staff to attach the weight adjusting member to the gimbal structure, and means projecting through the case for bending the staff in order to change the relative position of the weight and the gimbal in order to balance the gimbal after the apparatus has been assembled.

2. A gyroscopic unit as in claim 1 having in addition means for limiting the relative motion of the gimbal with respect to the case.

3. A gyroscopic unit comprising a case, a gyro rotor, a gimbal structure supporting the rotor, a plurality of coarse balancing screws threaded to said gimbal structure, means for adjusting the distance of said screws from the gimbal axis to achieve a coarse static balance, a plurality of fine static balancing weights, a plurality of bendable staffs attached to the gimbal and supporting the balancing weights, and means projecting through the case to bend the staffs after assembly thereby achieving a fine static balance.

4. A gyroscopic unit comprising a case, a gimbal assembly within the case, means for balancing the gimbal assembly, a gyro rotor-stator structure having a radially directed air gap, bearings to support the rotor and means for counterbalancing the flux forces tending to attract the rotor to the stator which comprises a stepped non-magnetic member on the stator structure and in the air gap to create hydrodynamic forces tending to support the rotor and to reduce the load on the bearings upon rotation of the rotor.

5. A gyroscopic unit comprising an outer case, a rotor-stator assembly, a gimbal to carry the rotor-stator assembly, a plurality of balancing weights, bendable balancing staffs attached to the gimbal supporting the balancing weights, an adjusting cam for each weight, and means extending through the case to operate the adjusting cams to position the balancing weights to achieve a static balance of the gimbal.

6. A gyroscopic unit comprising an outer case, a gimbal structure including an inner case capable of rotational motion within the outer case, a rotor-stator assembly for the gyro carried by the gimbal, a plurality of balancing weights attached to the inner case, balancing staffs attached to the inner case and supporting the balancing weights, a stop member limiting rotation of the inner case, adjusting cams to bend the staffs supporting the balancing weights, and a rod extending through the outer case to actuate each adjusting cam.

7. A gyroscopic unit comprising an outer case, a gimbal assembly, including an inner case capable of rotational motion within the outer case, a rotor-stator assembly carried by the gimbal, a plurality of balancing weights, balancing staffs attached to the gimbal and supporting the balancing weights, a stop member limiting the freedom of rotation of the inner case, an adjusting cam for each of the staffs, a rod extending through the outer case to control each adjusting cam whereby rotation of the rod will force the surface of the adjusting cam against the balancing weight and will thereafter turn the inner case until the stop member holds the inner case to permit the staff to be bent the desired amount.

8. A gyroscopic unit comprising a case, a gimbal assembly within the case, means for balancing the gimbal assembly, a gyro structure having two relatively rotatable motor members separated by a radially directed air gap, said motor members comprising a rotor and a stator, bearings for the rotor and means for counterbalancing the flux forces tending to attract the rotor to the stator which comprises a stepped non-magnetic member mounted on one of the relatively rotatable motor members and in the air gap to create hydrodynamic forces tending to support the rotor and to reduce the load on the bearings upon rotation of the rotor.

References Cited in the file of this patent

UNITED STATES PATENTS

| | | |
|---|---|---|
| 2,209,735 | Lauck | July 30, 1940 |
| 2,349,758 | Raspet | May 23, 1944 |
| 2,597,371 | Perkins et al. | May 20, 1952 |
| 2,672,054 | Warren et al. | Mar. 16, 1954 |
| 2,700,739 | Orlando | Jan. 25, 1955 |
| 2,707,882 | Kent | May 10, 1955 |